No. 786,699. PATENTED APR. 4, 1905.
L. C. WENDT.
WHIFFLETREE HOOK.
APPLICATION FILED MAR. 21, 1904. RENEWED JAN. 21, 1905.
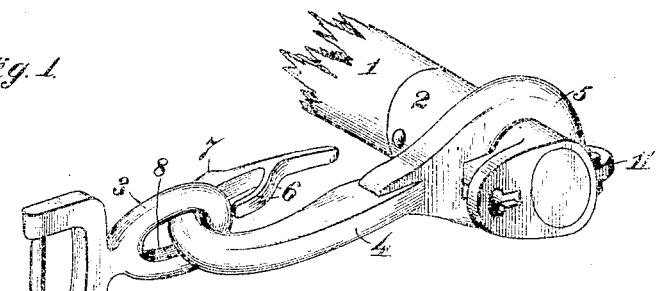
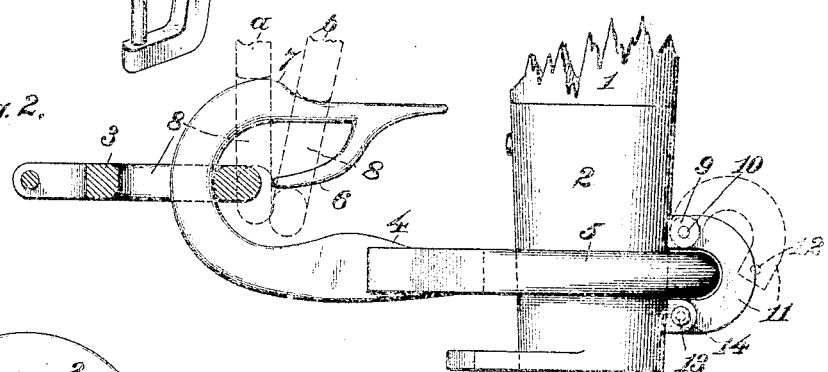
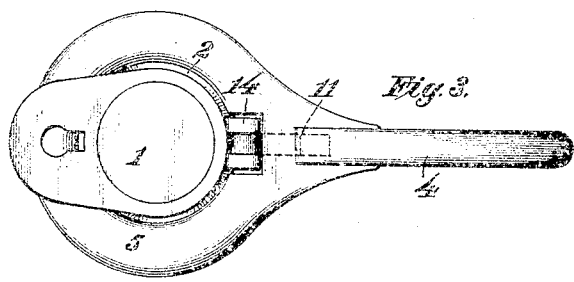
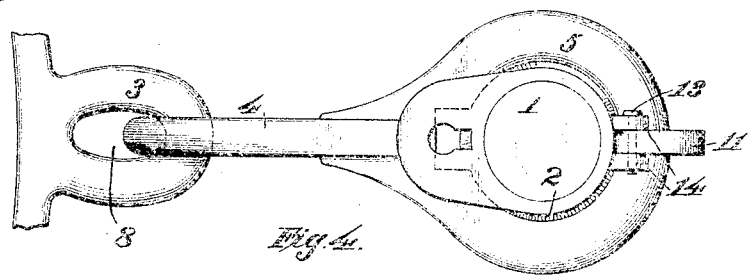
WITNESSES:
INVENTOR
Louis C. Wendt
BY
Bond
ATTORNEY No. 786,699. Patented April 4, 1905.

UNITED STATES PATENT OFFICE.

LOUIS C. WENDT, OF BLACKHAWK, COLORADO.

WHIFFLETREE-HOOK.

SPECIFICATION forming part of Letters Patent No. 786,699, dated April 4, 1905.

Application filed March 21, 1904. Renewed January 21, 1905. Serial No. 242,109.

*To all whom it may concern:*

Be it known that I, LOUIS C. WENDT, a citizen of the United States of America, and a resident of Blackhawk, in the county of Gilpin and State of Colorado, have invented certain new and useful Improvements in Whiffletree-Hooks, of which the following is a specification.

This invention relates to certain new and useful improvements in whiffletree-hooks, and it pertains more especially to that class of such devices in which provision is made to prevent the tug when in its working position from becoming detached from the hook, but which may be readily detached therefrom when desired by swinging the hook into a certain position with relation to the tug, or vice versa.

The present invention has for its objects, among others, to provide an improved, simple, and cheap construction of whiffletree-hook and mode of attachment to the whiffletree whereby the tug is more effectually held against disengagement from the hook and allowed greater freedom of movement.

I form the hook with a barb which is confined wholly within the outer wall of the hook, with no projecting parts to catch into bushes or other articles by which the hook might be caught and also providing for less danger of breakage. The extension of this barb from the point of the hook from the outer surface is such as to effectually prevent disengagement of the tug under any conditions of use and allowing of the removal of the tug only when brought by hand into a certain position, when the tug may be readily and easily removed.

Other objects and advantages of the invention will hereinafter appear, and the novel features thereof will be specifically defined by the appended claims.

The invention is clearly illustrated in the accompanying drawings, which, with the numerals of reference marked thereon, form a part of this specification, and in which—

Figure 1 is a perspective view showing the whiffletree broken off. Fig. 2 is a top plan at substantially right angles to Fig. 1. Fig. 3 is an end view. Fig. 4 is an end view looking in the opposite direction.

Like numerals of reference indicate like parts throughout the several views.

Referring now to the details of the drawings, 1 designates the whiffletree, 2 the socket or tip, and 3 the ordinary eye of the hame-tug, all of which parts are of well-known or approved forms of construction, except as hereinafter specified.

4 is the hook, having an eye portion 5, which loosely embraces the tip or socket portion 2, as shown, and the hook portion proper is provided with the barb 6, which is confined entirely within the space included within the opposite walls of the hook, as seen best in Fig. 2. The outer wall of the hook is formed with an enlargement or hump 7 at a point opposite the greatest diameter of the hook, as seen in Fig. 2, for a purpose which will soon be obvious. The opening 8 in the tug-eye is of such shape and dimensions, as seen in Fig. 2, that the tug-eye cannot possibly become detached from the hook under any ordinary conditions of use and can only be disengaged by bringing the tug-eye into a position *a*, (seen in dotted lines in Fig. 2,) and then into the position *b*, (seen in said view,) and then by continued movement in the direction of the arrow in said view the tug-eye can be removed.

In order to hold the hook on the tip or socket portion, I provide the latter with the lugs 9, between which is pivotally mounted, as at 10, one end of the arm 11, the other end of which is provided with an opening 12, which is adapted to receive the pin 13, which is removably held in the lugs 14 on the tip or socket portion. The loop or ring portion 5 of the hook is slipped over the end of the tip and between the lugs 9 and 14, and then the arm 11 is swung into place and secured by the pin 13. This holds the hook securely in place, yet permits of its ready removal when desired.

Modifications in the details of construction, form, and proportion of parts may be resorted to without departing from the spirit of the invention or sacrificing any of its advantages.

What is claimed as new is—

1. A whiffletree-hook provided with a barb entirely within its outer wall, and an exterior hump.

2. A whiffletree-hook formed with a barb entirely within its opposite outer walls and having upon one of said outer walls a hump opposite the largest diameter through the hook.

3. A whiffletree-hook formed with a barb, and an exterior hump, combined with a tug-eye having an opening of a length equal to the distance between the inner face of the said barb and the outer wall of the hook adjacent said hump.

4. The combination with a tip having a hinged arm, of a whiffletree-hook having a loop portion to loosely embrace said tip, and means for removably engaging the free end of said arm to hold the hook on the tip.

5. The combination with a tip having lugs in pairs, and an arm curved and hinged to one set of lugs, a whiffletree-hook having a loop portion loosely embracing said tip and disposed between the two sets of lugs, and a removable fastening for the free end of the said curved arm to hold the same and the hook in place on the tip.

Signed by me in Gilpin county, Colorado, this 10th day of March, 1904.

LOUIS C. WENDT.

Witnesses:
PHILIPP J. SCHMIDT,
JAMES M. SERIGHT.